Patented July 15, 1952

UNITED STATES PATENT OFFICE 2,603,631

TETRAKISAZO DYESTUFFS

Werner Bossard, Riehen, near Basel, and Otto Bitterlin, Basel, Switzerland, assignors to J. R. Geigy A. G., Basel, Switzerland, a Swiss firm No Drawing. Application November 20, 1950, Serial No. 196,720. In Switzerland November 25, 1949

7 Claims. (Cl. 260—159)

The present invention concerns the production of copperable brown cellulose dyestuffs which are distinguished by their very good general properties.

The group of copperable polyazo dyestuffs which draw direct on to cellulose is very popular, because these dyestuffs are simple to use, are generally very fast to light and are also relatively cheap. They also gained in importance after the production of new types which, in addition to their other properties, are distinguished by excellent wet fastness properties, as their coppered cellulose dyeings withstand repeated soap washings without any important change of shade. A further important property which affects the fastness to wear and tear and therefore the application possibilities of such copperable dyestuffs, is the fastness to perspiration. The new tetrakisazo dyestuffs according to the present invention now give coppered brown dyeings on cellulose fibres which are not only distinguished by very good fastness to light, water and washing, but also, in comparison with similar known dyestuffs, are distinguished by improved fastness to acid and perspiration. They are, therefore, a great improvement on the previously known similar dyestuffs.

The copperable tetrakisazo dyestuffs according to this invention are obtained by combining 1 mol of a tetrazotised diamino compound of the general Formula I

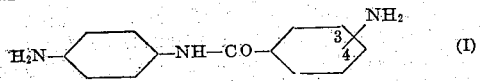

wherein the right-hand $NH_2$ group is attached to the adjacent benzene nucleus in one of the positions 3 and 4, with 1 mol of a disazo dyestuff of the general Formula II

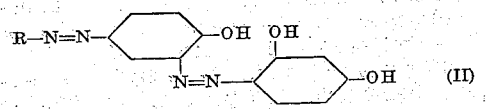

wherein R represents an aromatic radical which contains at least one group rendering it water soluble, and with 1 mol of 3-methyl-5-pyrazolone. It is advantageous to combine the tetrazo compound of the diamine I first with the disazo dyestuff of Formula II and then with the 3-methyl-5-pyrazolone. The dyestuffs produced from the p-aminobenzoyl compound often have better properties than the corresponding dyestuffs made up from the m-aminobenzoyl compound, and therefore are preferred.

Those diazonium compounds from aminonaphthalene sulphonic acids, particularly monosulphonic acids and preferably those from aminobenzene sulphonic and carboxylic acids are employed for the introduction of the radical R of the disazo dyestuff of the general Formula II, the benzene ring of which can also contain further substituents usual in azo dyestuffs such as halogen, alkyl and alkoxy groups and, in contrast to the diamino compound of Formula I, can also contain groups suitable for the formation of a metal complex, in particularly the ortho-hydroxy-carboxy configuration. The 3-aminobenzene-1-sulphonic acids and the 3-aminobenzene-1-carboxylic acids, of these for example metanilic acid, 6-chloro- and 6-methyl-3-aminobenzene sulphonic acids, 6-hydroxy-aminobenzene carboxylic acid and 6-hydroxy-5-sulpho-3-aminobenzoic acid can be emphasised as particularly suitable compounds for the introduction of the radical R. The disazo dyestuff of the general Formula II is obtained from the diazonium compounds of the above named aminonaphthalene and aminobenzene compounds by methods known per se by coupling with a 2-acylamino phenol, splitting off of the acyl radical by saponification, further diazotisation of the aminoazo dyestuff so obtained and coupling the diazonium compound with resorcinol.

In the form of their water soluble alkali salts the dyestuffs according to this invention are dark powders which draw very well onto cellulose fibres from a dyebath containing Glauber's salt under the usual conditions for direct dyestuffs. Coppering can take place in the dyebath or in a fresh bath with the usual copper salts, e. g. with copper sulphate or copper acetate in a neutral or weakly acid medium. If desired, copper compounds which are resistant to alkali can be used, such as can be obtained for example by reacting copper sulphate with sodium tartrate in a soda alkaline bath.

The following examples illustrate various ways of performing the process without limiting it in any way. Parts are given as parts by weight and temperatures are in degrees centigrade.

EXAMPLE 1

15.3 parts of 1-amino-4-hydroxybenzene-5-carboxylic acid are diazotised in the usual way with 6.9 parts of sodium nitrite and 16 parts of hydrochloric acid 30% in 300 parts of water. The diazo compound is then combined in the presence of pyridine with a cold aqueous solution of 14.1 parts of 1-formylamino-2-hydroxybenzene, 15 parts of 30% caustic soda lye and 8.4 parts of sodium carbonate. On completion of the coupling, the formylamino group is saponified by heating in a caustic alkaline solution and at the same time the pyridine is removed. The dyestuff is then further diazotised by the addition of 7.6 parts of sodium nitrite and 20% by volume of common salt and the rapid addition of hydrochloric acid in a Congo red acid medium in the cold. The diazonium compound so formed is filtered off, pasted with ice water and coupled with a cold aqueous solution of 11 parts of 1.3-dihydroxybenzene and 30 parts of sodium carbonate. On completion of the coupling, the disazo dyestuff so formed is precipitated by the addition of hydrochloric acid until a Congo red acid reaction is obtained, filtered off, and again dissolved in water as sodium salt by the dropwise addition of caustic soda lye. This solution is coupled with a tetrazo compound produced in the usual manner from 19.1 parts of 1-(4'-aminobenzoylamino)-4-aminobenzene, 11.6 parts of sodium nitrite and 44 parts of 30% hydrochloric acid in an acetic acid medium and, after this tetrazo compound has disappeared, an aqueous solution of the sodium salt of 8.4 parts of 3-methyl-5-pyrazolone is added. Thereafter, an aqueous solution of 7.2 parts of sodium bicarbonate in 144 parts of water is added slowly. On completion of the coupling, the tetrakisazo dyestuff of the formula:

6.9 parts of sodium nitrite and are coupled with 16 parts of 1-acetylamino-2-hydroxybenzene in the presence of 14.6 parts of 30% caustic soda lye and 25 parts of sodium carbonate. On completion of the coupling, the dyestuff is saponified by heating with diluted caustic soda lye, it is then precipitated cold with sulphuric acid and filtered off. The dyestuff is then dissolved in water and 17 parts of 30% caustic soda lye, 20% common salt is added, and it is diazotised with 7.7 parts of sodium nitrite and 50 parts of hydrochloric acid (density 1.16) in the cold. The diazonium compound is filtered off, and in a paste, is coupled with 11 parts of 1.3-dihydroxybenzene in the presence of 40 parts of sodium carbonate. The disazo dyestuff is precipitated with 125 parts of hydrochloric acid (density 1.16), filtered, and dissolved in water and 20 parts of 30% caustic soda lye. The intermediate product is produced by the addition of this solution to the tetrazo compound from 19.1 parts of 1-(4'-aminobenzoyl-

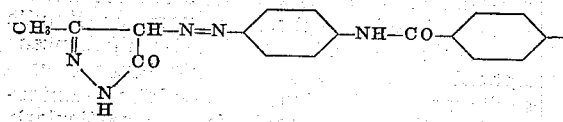 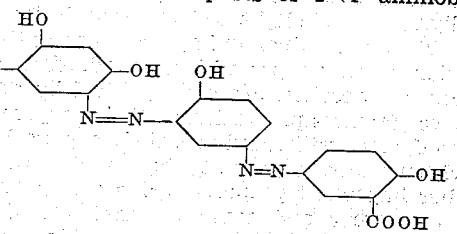

is isolated and dried.

The tetrakisazo dyestuff is a dark powder which dissolves with a brown colour in both water and in concentrated sulphuric acid. It dyes natural or regenerated cellulose fibres in brown shades which, after treatment with copper comamino)-4-aminobenzene in a weak litmus acid solution. 8.4 parts of 3-methyl-5-pyrazolone are added in a neutral aqueous solution and then 7.2 parts of sodium bicarbonate in 144 parts of water are added. On completion of the coupling, the dyestuff is salted out hot, filtered off and dried. It corresponds to the formula

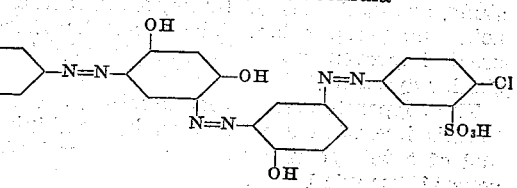

pounds according to one of the usual methods, have very good fastness properties.

If 16.7 parts of 1-amino-3-methyl-4-hydroxybenzene-5-carboxylic acid, 23.3 parts of 1-amino-4-hydroxy-5-carboxybenzene-3-sulphonic acid, 23.3 parts of 1-amino-2-hydroxy-3-carboxybenzene-5-sulphonic acid, 13.7 parts of 1-aminobenzene-3-carboxylic acid, 13.7 parts of 1-aminobenzene-4-carboxylic acid or 18.85 parts of 1-amino-4-hydroxy-3-chlorobenzene-5-carboxylic acid are used instead of 15.3 parts of 1-amino-4-hydroxybenzene-5-carboxylic acid and the above described method is followed, dyestuffs with similar properties are obtained. The formula of the compound obtained when 13.7 parts of 1-aminobenzene-3-carboxylic acid are used is The dyestuff, in the form of a dark powder, dissolves in water and in concentrated sulphuric acid with a brown colour. It dyes cellulose fibres in brown shades which, when treated with copper sulphate, have very good light, washing, acid and perspiration fastness properties.

If 20.75 parts of 1-amino-2-chlorobenzene-5-sulphonic acid, 24.2 parts of 1-amino-2.4-dichlorobenzene-6-sulphonic acid, 24.2 parts of 1-amino-3.6-dichlorobenzene-4-sulphonic acid, 18.7 parts of 1-amino-4-methylbenzene-2- or -3-sulphonic acid, 18.7 parts of 1-amino-2-methylbenzene-5-sulphonic acid, 21.7 parts of 1-amino-4-ethoxybenzene-3-sulphonic acid, 22.3 parts of 1-aminonaphthalene-4-, -5- or -6-sulphonic acid are used instead of 20.75 parts of 1-amino-4-chlorobenzene-3-sulphonic acid and the above described method is followed, dyestuffs with simi-

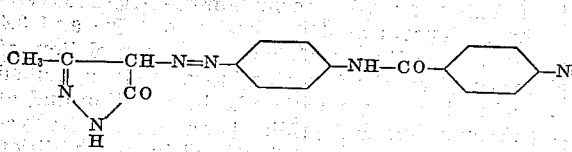 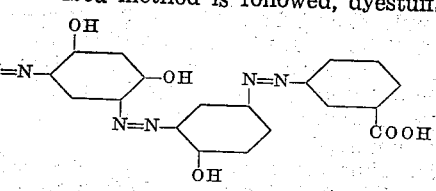

EXAMPLE 2

20.75 parts of 1-amino-4-chlorobenzene-3-sulphonic acid are diazotised in the usual way with lar properties are obtained. The formula of the compound obtained when 18.7 parts of 1-amino- 4-methylbenzene-3-sulphonic acid are used is

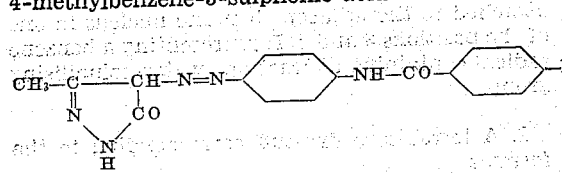
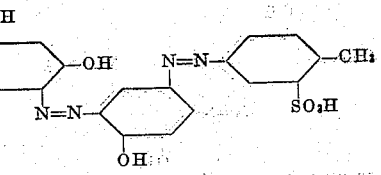

EXAMPLE 3

The diazonium compound from 13.7 parts of 1-aminobenzene-3-carboxylic acid is coupled with 18.7 parts of 1-oxalylamino-2-hydroxybenzene in the presence of 29.2 parts of 30% caustic soda lye and 25 parts of sodium carbonate and the monoazo dyestuff so formed is saponified hot with diluted caustic soda lye. The dyestuff is then further diazotised cold with 7.6 parts of sodium nitrite and 50 parts of hydrochloric acid (density 1.16) in the presence of 20% common salt. The diazonium compound is filtered off, and as a dispersion is coupled with 11 parts of 1.3-dihydroxybenzene and 40 parts of sodium carbonate. The disazo dyestuff is precipitated with 100 parts of hydrochloric acid, filtered off and dissolved with water and 20 parts of 30% caustic soda lye. This solution is then added to the tetrazo compound from 19.1 parts of 1-(3'-aminobenzoylamino)-4-aminobenzene. After the intermediate product has formed in a weakly acetic acid solution, 8.4 parts of 3-methyl-5-pyrazolone are added in a neutral aqueous solution and finally 7.2 parts of sodium bicarbonate in 144 parts of water are added. The tetrakisazo dyestuff is filtered off hot and dried.

The dyestuff is a dark powder and dissolves in water and in concentrated sulphuric acid with a brown colour. It dyes cellulose fibres in brown shades which, after treatment with copper sulphate, have very good fastness properties.

EXAMPLE 4

1.5 parts of the dyestuff obtained according to Example 2 are dissolved in a dyebath in 3000 parts of water and 2 parts of soda. 100 parts of cotton are entered at 40–50°, the bath is heated to 90–95° within 30 minutes, 30 parts of sodium sulphate are added and dyeing is performed for 45 minutes at this temperature. The dyed goods are then rinsed in cold water, and after-treated at 70° for 30 minutes in a fresh bath containing 2 parts of crystallised copper sulphate in 2000 parts of water and 2 parts of 50% acetic acid. The goods are then rinsed and dried in the usual manner. The cotton is dyed in brown shades with very good fastness properties.

Further dyestuffs produced according to this invention and the processes described in Examples 1–3 of the following general formula are summarised in the following table, in which the diazo component introducing the radical R into the compound of the general Formula II is shown in column 1, and the diamino compound of the general Formula I is shown in column 2:

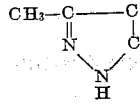
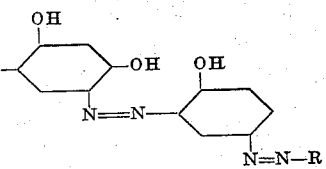

Table

| No. | Diazo component (R)—NH₂ | Diamino compound (I) | Shade of copper containing dyeing on cellulose fibres |
|---|---|---|---|
| 1 | 1-aminobenzene-3-sulphonic acid | 1-(3'-aminobenzoylamino)-4-aminobenzene. | Brown. |
| 2 | 1-amino-2.4-dimethylbenzene-6-sulphonic acid | 1-(4'-aminobenzoylamino)-4-aminobenzene. | Do. |
| 3 | 1-amino-4-hydroxybenzene-3-carboxylic acid | 1-(3'-aminobenzoylamino)-4-aminobenzene. | Do. |
| 4 | 1-aminonaphthalene-4-sulphonic acid | do | Do. |
| 5 | 1-amino-4-chlorobenzene-3-sulphonic acid | do | Do. |
| 6 | 1-aminobenzene-4-sulphonic acid | 1-(4'-aminobenzoylamino)-4-aminobenzene. | Do. |
| 7 | 1-aminobenzene-3-sulphonic acid | do | Do. |
| 8 | 1-amino-4-methylbenzene-3-sulphonic acid | 1-(3'-aminobenzoylamino)-4-aminobenzene. | Do. |
| 9 | 1-amino-2-chlorobenzene-5-sulphonic acid | do | |

The formula of the dyestuff corresponding to item 7 of the foregoing table is as follows:

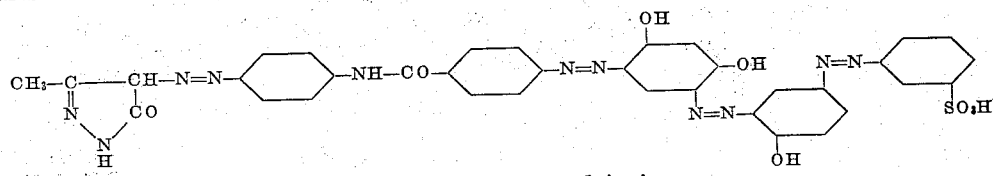

What we claim is:
1. A tetrakisazo dyestuff corresponding to the formula

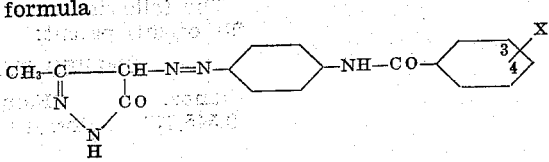

wherein X stands for the grouping

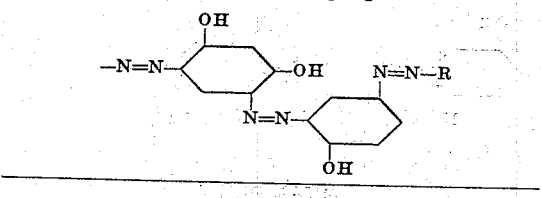

attached to the adjacent benzene nucleus in one of the positions 3 and 4, R representing a benzene radical containing at least one water-solubilising group.

2. A tetrakisazo dyestuff corresponding to the formula

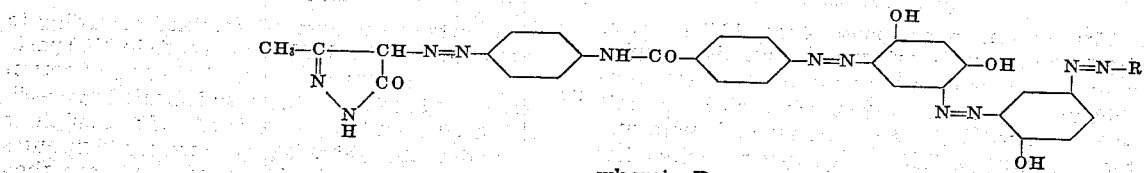

wherein R represents a benzene radical containing at least one water-solubilising group.

3. A tetrakisazo dyestuff corresponding to the formula

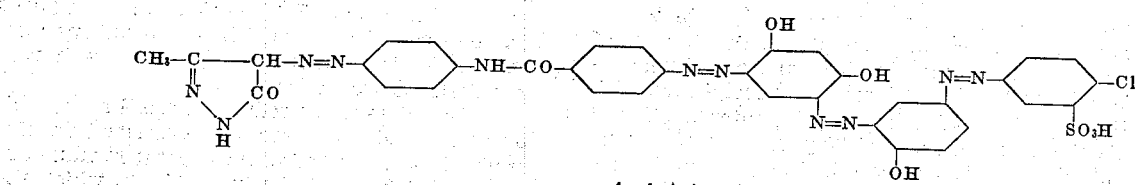

4. A tetrakisazo dyestuff corresponding to the formula

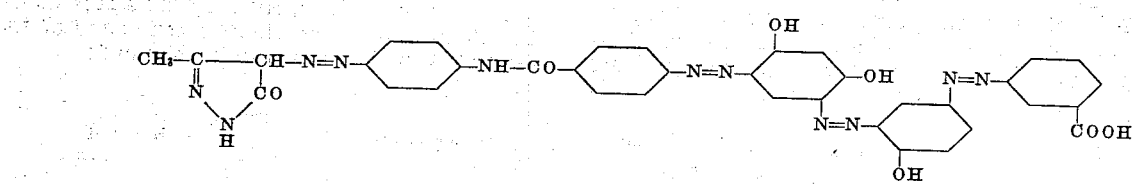

5. A tetrakisazo dyestuff corresponding to the formula

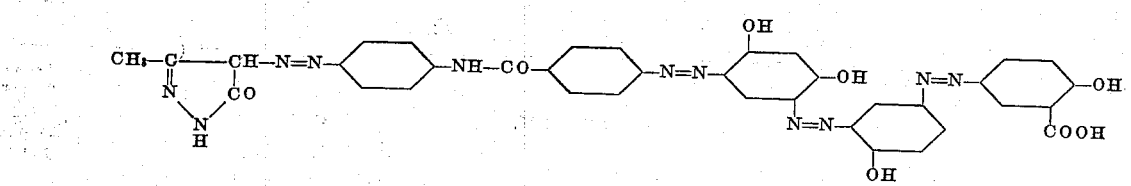

6. A tetrakisazo dyestuff corresponding to the formula

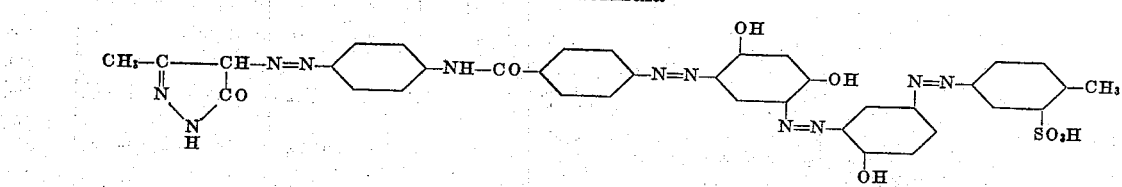

7. A tetrakisazo dyestuff corresponding to the formula

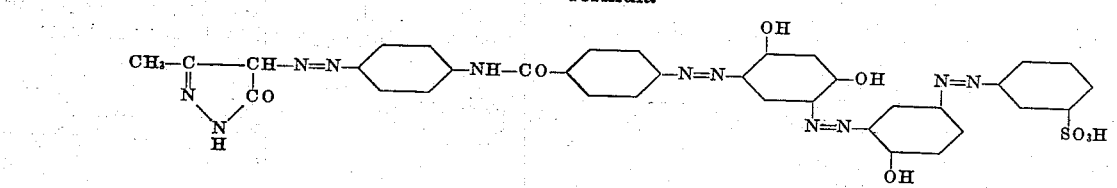

WERNER BOSSARD.
OTTO BITTERLIN.

REFERENCES CITED

The following references are of record in the file of this patent:

UNITED STATES PATENTS

| Number | Name | Date |
|---|---|---|
| 2,545,872 | Bossard | Mar. 20, 1951 |